US009882927B1

(12) United States Patent
Chiles

(10) Patent No.: US 9,882,927 B1
(45) Date of Patent: Jan. 30, 2018

(54) PERIODICITY DETECTION

(71) Applicant: EMC Corporation, Hopkinton, MA (US)

(72) Inventor: Richard Chiles, Castro Valley, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 47 days.

(21) Appl. No.: 14/319,645

(22) Filed: Jun. 30, 2014

(51) Int. Cl.
*H04L 29/06* (2006.01)
*H04L 12/26* (2006.01)

(52) U.S. Cl.
CPC ...... *H04L 63/1441* (2013.01); *H04L 63/1408* (2013.01); *H04L 63/1416* (2013.01); *H04L 63/1425* (2013.01); *H04L 43/062* (2013.01); *H04L 63/1433* (2013.01); *H04L 2463/121* (2013.01)

(58) Field of Classification Search
CPC ............ G06Q 30/0248; H04L 63/1408; H04L 2463/144; H04L 63/1416; H04L 63/1441; H04L 43/04; H04L 63/1425; H04L 43/062; H04L 63/1433; H04L 2463/121; H04L 63/1458; H04L 67/22; H04L 43/08; H04L 43/16; H04L 2463/141
See application file for complete search history.

(56) References Cited

U.S. PATENT DOCUMENTS

| 7,657,626 | B1 * | 2/2010 | Zwicky ................. G06Q 30/02 705/51 |
| 7,734,502 | B1 * | 6/2010 | Yehoshua ............. G06Q 30/02 705/14.47 |
| 7,933,984 | B1 * | 4/2011 | Smith ................ G06Q 10/0639 705/14.47 |
| 7,953,667 | B1 * | 5/2011 | Zuili .................. G06Q 30/0248 705/52 |
| 8,191,149 | B2 | 5/2012 | Yun et al. |
| 8,402,543 | B1 * | 3/2013 | Ranjan ................ H04L 63/1416 709/223 |
| 8,533,825 | B1 * | 9/2013 | Marsa ..................... H04L 29/06 726/22 |
| 8,555,388 | B1 * | 10/2013 | Wang .................. H04L 63/1416 709/245 |
| 8,566,928 | B2 * | 10/2013 | Dagon ............. H04L 29/12066 726/22 |

(Continued)

*Primary Examiner* — Lisa Lewis
*Assistant Examiner* — Christopher C Harris
(74) *Attorney, Agent, or Firm* — BainwoodHuang

(57) ABSTRACT

Improved techniques involve testing periodicity at a given period based on locations of clicks within a sampling window whose duration is a multiple of the given period. Along these lines, when a testing server receives a click stream from a client machine, the testing server assigns a timestamp to each of the clicks in the click stream. The testing server generates a list of candidate periods at which periodicity of the click stream is to be tested. For each of the candidate periods, the testing server forms a sampling window whose duration is a multiple of that candidate period and tests whether the click stream is periodic based on the locations of the clicks within the sampling window. If indeed the testing server finds that the click stream is periodic at any of the candidate periods, the testing server may send an alert to a security entity to indicate that suspect activity has been identified.

19 Claims, 6 Drawing Sheets

(56) References Cited

U.S. PATENT DOCUMENTS

| | | | |
|---|---|---|---|
| 8,838,570 B1* | 9/2014 | English | H04L 63/1408 707/709 |
| 9,027,127 B1* | 5/2015 | Soldo | H04L 63/1425 705/14.2 |
| 2005/0144067 A1* | 6/2005 | Farahat | G06Q 30/02 705/14.52 |
| 2006/0136294 A1* | 6/2006 | Linden | G06Q 30/0257 705/14.47 |
| 2007/0255821 A1* | 11/2007 | Ge | G06Q 10/00 709/224 |
| 2008/0148106 A1* | 6/2008 | Chow | G06Q 10/0635 714/49 |
| 2008/0294711 A1* | 11/2008 | Barber | G06Q 30/02 709/201 |
| 2008/0319774 A1* | 12/2008 | O'Sullivan | G06Q 10/101 705/300 |
| 2009/0024971 A1* | 1/2009 | Willner | G06Q 30/02 716/106 |
| 2009/0094311 A1* | 4/2009 | Awadallah | H04L 63/1441 709/202 |
| 2009/0164269 A1* | 6/2009 | Gupta | G06F 21/552 705/14.47 |
| 2009/0303894 A1* | 12/2009 | Keohane | G06Q 30/02 370/252 |
| 2010/0082400 A1* | 4/2010 | Bagherjeiran | G06Q 30/02 705/14.47 |
| 2010/0228852 A1* | 9/2010 | Gemelos | G06Q 30/02 709/224 |
| 2011/0055921 A1* | 3/2011 | Narayanaswamy | H04L 63/1458 726/22 |
| 2011/0185421 A1 | 7/2011 | Wittenstein et al. | |
| 2012/0240224 A1* | 9/2012 | Payne | H04L 63/1416 726/21 |
| 2012/0323677 A1* | 12/2012 | Bottou | G06Q 30/0242 705/14.45 |
| 2013/0110648 A1* | 5/2013 | Raab | G06Q 30/0241 705/14.73 |
| 2013/0326620 A1* | 12/2013 | Merza | H04L 63/1408 726/22 |
| 2015/0135315 A1* | 5/2015 | Ahmed | H04L 63/1441 726/23 |
| 2015/0156084 A1* | 6/2015 | Kaminsky | H04L 43/04 709/224 |
| 2015/0264068 A1* | 9/2015 | Beauchesne | H04L 63/1416 726/23 |
| 2015/0326587 A1* | 11/2015 | Vissamsetty | H04L 63/145 726/23 |
| 2015/0326674 A1* | 11/2015 | Kruglick | H04L 12/66 709/224 |

* cited by examiner

PERIODICITY DETECTION

BACKGROUND

Websites that provide electronic services receive input from client machines in the form of click streams. For example, a website hosting an online banking service may receive a stream of clicks over the course of an online banking session. A "click" represents a request to access content from a web site or to process data, such as may occur when a user points to and clicks on a link. "Clicks" are not limited to pointer clicks, however, but may include any requests from a client machine to a webserver. A "click stream" or "stream of clicks" is a sequence of clicks over time.

Occasionally, a click stream may exhibit temporally periodic behavior, e.g., a click stream may exhibit a click once per second to reflect requests made once per second from a client machine. Conventional approaches to detecting periodicity in click streams involve verifying whether clicks in the click stream are evenly spaced in time.

SUMMARY

Unfortunately, there are deficiencies with the above-described conventional approaches to detecting periodicity in click streams. For example, input sent from a client machine to a service provider is susceptible to variable delays due to, among other things, differences in packet switching through a network. Consequently, periodic input generated at a client machine may appear nonperiodic when received by the service provider. Because periodicity in a click stream may indicate that the clicks are generated by an automated program such as a botnet, failure to properly detect periodicity in a click stream may result in a failure to detect malicious activity.

Further, the presence of machine driven requests also affect the ability to detect of periodicity. For example, some pages that require multiple pieces of information each send out several requests (aka. clicks) to the web server for information. In this case, the click sequence starts with the main page requests followed by a rapid series of ancillary requests. Because periodicity is measured between the main requests, time differences between the main and ancillary requests may cause confusion for those detectors employing a conventional approach.

In contrast with the above-described conventional approaches to detecting periodicity, which do not account for the way noise impacts the arrival times of clicks, improved techniques involve testing periodicity at a given period based on locations of clicks within a sampling window whose duration is a multiple of the given period. Along these lines, when a testing server receives a click stream from a client machine, the testing server assigns a timestamp to each of the clicks in the click stream. The testing server generates a list of candidate periods at which periodicity of the click stream is to be tested. For each of the candidate periods, the testing server forms a sampling window whose duration is a multiple of that candidate period and tests whether the click stream is periodic based on the locations of the clicks within the sampling window. If indeed the testing server finds that the click stream is periodic at any of the candidate periods, the testing server may send an alert to a security entity to indicate that suspect activity has been identified.

Advantageously, the improved techniques test for a periodic signature containing more than a single periodic request. For example, timestamps assigned to clicks in a click stream may be placed in bins according to their time offset from the start of a candidate period, such that a single periodic click stream would have all of its clicks placed in a single bin. Ancillary requests appear in the same or different bins, depending on the time spacing. The click distribution amongst the bins is tested for a multiple click periodicity.

Additionally, the improved techniques provide a test for periodicity that is more tolerant to noise than conventional approaches. The bins correspond to time intervals of finite width and the bin width is selected to to reduce sensitivity to timing variations in incoming clicks. The distribution of click counts over the bins thus provides a noise-tolerant measure of likelihood that the click stream is periodic at the candidate period.

One embodiment of the improved techniques is directed to a method of identifying suspect access to a web server in a computing environment. The method includes receiving, by a testing server, a stream of clicks from a client machine, each click of the stream i) being assigned a timestamp upon receipt by the testing server and ii) indicating a request from a web client on the client machine to the web server. The method also includes generating, by the testing server, a list of candidate periods at which to test the stream of clicks for temporal periodicity. The method further includes, for each of the list of candidate periods, i) setting, by the testing server, the duration of a sampling window to an interval that includes an integer multiple of the respective candidate period, and ii) testing, by the testing server, whether the stream of clicks is temporally periodic at the respective candidate period based on locations of clicks within the sampling window. The method further includes sending, by the testing server in response to the testing indicating that the stream of clicks is periodic at one or more of the candidate periods, an alert to a security entity to indicate that suspect activity has been identified.

Additionally, some embodiments of the improved technique are directed to a system constructed and arranged to identify suspect access to a web server in a computing environment. The apparatus includes memory and a controller including controlling circuitry constructed and arranged to carry out the method of identifying suspect access to a web server in a computing environment.

Further, some embodiments of the improved technique are directed to a computer program product having a non-transitory computer readable storage medium that stores code including a set of instructions which, when executed by a computer, cause the computer to carry out the method of identifying suspect access to a web server in a computing environment.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

Improved techniques involve testing periodicity at a given period based on locations of clicks within a sampling window whose duration is a multiple of the given period. The testing server generates a list of candidate periods at which periodicity of the click stream is to be tested. If the testing server finds that the click stream is periodic at any of the candidate periods, the testing server may send an alert to a security entity to indicate that suspect activity has been identified.

Figure 1:
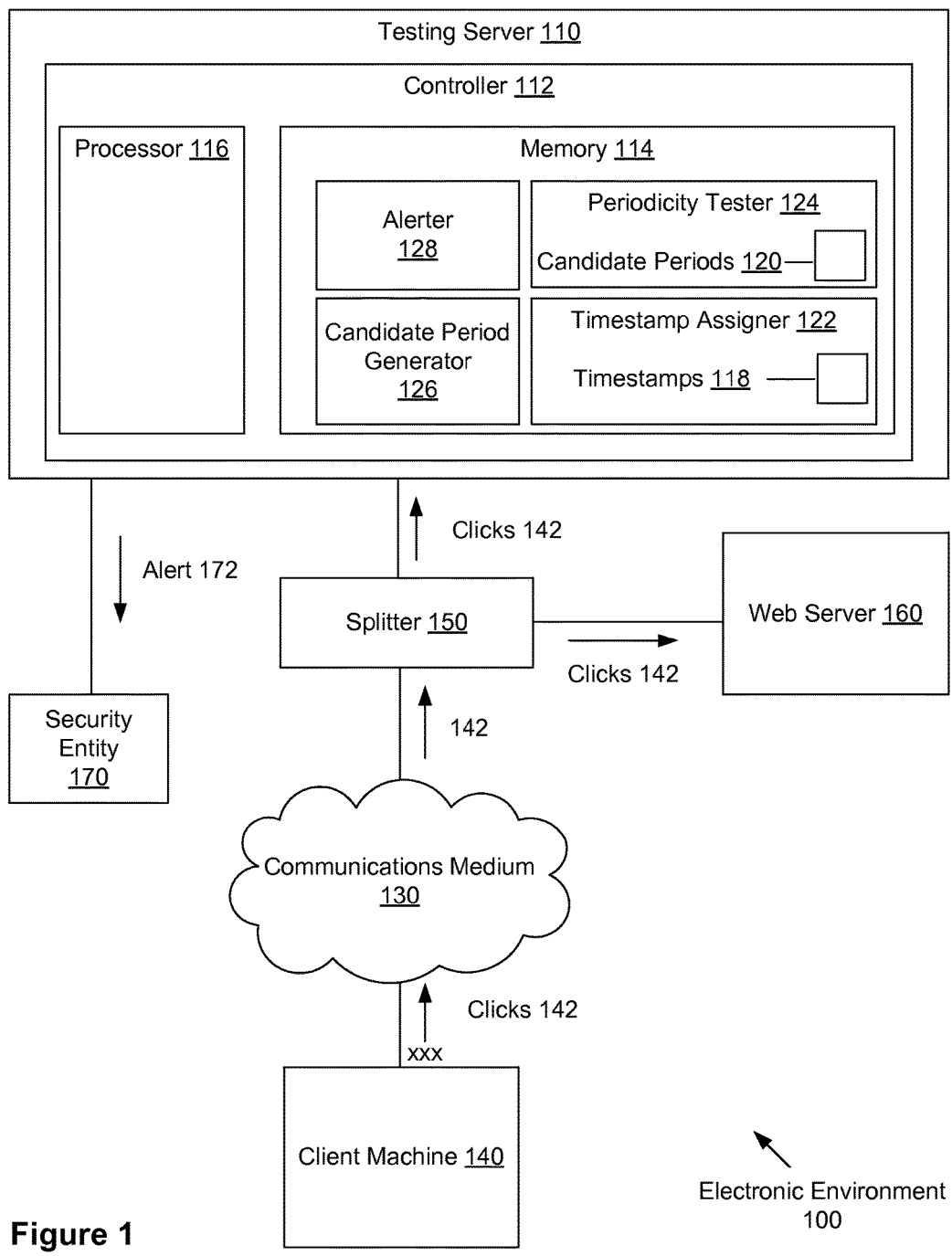
FIG. 1 is a block diagram illustrating an example electronic environment in which the improved technique can be carried out.

FIG. 1 illustrates an example electronic environment 100 in which the improved techniques hereof can be carried out. Electronic environment 100 includes testing server 110, communication medium 130, client machine 140, splitter 150, web server 160, and security entity 170.

Testing server 110 is configured to identify suspect access to web server 160. In the example shown, the testing server 110 is implemented within a computer that includes a controller 112 that contains memory 114 and a processor 116 coupled to memory 114. The computer hosting testing server 110 typically shares a local area network (LAN) with web server 160, although this is by no means a requirement. Although the computer hosting testing server 110 is shown as being separate from splitter 150 and web server 160, this is not required. In some arrangements, testing server 110, splitter 150, and web server 160 may be integrated within a single device or among multiple devices in any suitable manner.

Processor 116 is configured to execute instructions stored in memory 114. Processor 116 takes the form of a set of CPUs, each of which can include a single core or multiple cores.

Memory 114 is configured to store various software constructs running on testing server 110, such as timestamp assigner 122, periodicity tester 124, candidate period generator 126, and alerter 128. Memory 114 is further configured to store data generated by these modules, such as a list of candidate periods 120 and timestamps 118. Memory 114 may include both volatile memory (e.g., RAM) and non-volatile memory, e.g., one or more flash drives and/or disk drives.

Timestamp assigner 122, when executed by processor 116, causes processor 116 to assign a timestamp 118 to each click received at testing server 110.

Periodicity tester 124, when executed by processor 116, causes processor 116 to test whether a stream of clicks is temporally periodic at a given candidate period based on temporal locations of clicks within a sampling window that encompasses multiple clicks, with each click represented with a timestamp. Periodicity tester 124 also causes processor 116 to set the duration of the sampling window to an interval that preferably includes an integer multiple of periods of the candidate period.

Candidate period generator 126, when executed by processor 116, causes processor 116 to generate a list of candidate periods. Each candidate period in the list represents a possible period at which the click stream may be temporally periodic. In some arrangements, processor 116 generates the list of candidate periods by forming differences between pairs of timestamps assigned to clicks of the click stream.

Alerter 128, when executed by processor 116, causes processor 116 to send an alert 172 to a security entity 170 in response to the testing indicating that the stream of clicks is periodic at one or more of the list of candidate periods. Alert 172 to security entity 170 indicates that suspect activity has been identified because of periodic behavior detected in a stream of clicks.

Communications medium 130 provides network connections between client machine 140 and splitter 150. Communications medium 130 may implement any of a variety of protocols and topologies which are in common use for communications over the internet. Furthermore, communications medium 130 may include various components (e.g., cables, switches/routers, gateways/bridges, etc.) that are used in such communications.

Client machine 140 is configured to generate clicks 142 from human user input or an automated program running on the client machine 140, e.g., a botnet. Client machine 140 may be any type of computing device capable of generating clicks 142, such as a desktop computer, a laptop computer, a tablet computer, a smartphone, and the like.

Splitter 150 is configured to receive clicks 142 and to route each of clicks 142 to web server 160 and testing server 110. In an example, splitter 150 is located separately from web server 160 and testing server 110. For example, splitter 150 may be a dedicated appliance. In some arrangements, however, splitter 150 may be embedded within a router. In other arrangements, splitter 150 may be embedded within web server 160 or testing server 110, or located elsewhere.

Web server 160 is configured to receive clicks 142 for providing electronic services to client machines, such as client machine 140.

Security entity 170 is configured to receive and act upon alert 172. For example, security entity 170 may perform an investigation to determine the origin of the generation of the stream of clicks 142. Security entity 170 may take the form of a computer operated by an administrator of web server 160, although other forms such as software embedded within testing server 110 are possible.

During operation, client machine 140 generates click stream 142 in response to input received from a human user or an automated program, such as a botnet. A human user might generate clicks 142 using an I/O device such as mouse, keyboard, touchpad, or the like, to click on hyperlinks displayed on web pages in a browser running on client machine 140. Such a human user would typically issue such clicks irregularly in time. An automated program, such as a botnet, however, may cause client machine 140 to issue clicks 142 directly, i.e., without the use of an I/O device, and is likely to issue clicks 142 periodically in time.

It should be understood that each timestamp 118 reflects a time at which a respective click is received at testing server 110. Even if stream 142 is perfectly periodic in time, environmental factors within electronic environment 100 may cause clicks 142 as received by testing server 110 to be irregular in time. For example, communications medium 130 may introduce noise (e.g., jitter) in the form of traffic-dependent packet delays.

Client machine 140 sends click stream 142 to web server 160 over communications medium. Splitter 150, however, receives click stream 142 from communications medium 130. Splitter 150 routes click stream 142 to testing server 110 as well as web server 160. Upon receipt of click stream 142, web server 160 processes the requests indicated by clicks 142 as usual.

Upon receipt of click stream 142 by the testing server 110, however, processor 116 assigns a timestamp 118 to each click of the click stream 142. Each assigned timestamp 118 corresponds to a specific instant in time, e.g., the moment a click is received at testing server 110. Processor 116 then stores the assigned timestamps in memory 114.

After receiving a specified number of clicks in click stream 142, processor 116 generates a list of candidate periods 120 based on the timestamps 118 assigned to those clicks and stores the list of candidate periods 120 in memory 114.

For each of the candidate periods, processor 116 forms a sampling window that encompasses a set of the timestamps 118 stored in memory 114. The sampling window has a duration equal to some integer multiple of the respective candidate period. In some arrangements, the multiple is the smallest multiple of the respective candidate period greater than the difference between the latest and earliest assigned timestamps stored in memory 114.

Upon formation of the sampling window at the respective candidate period, processor 116 performs a test of whether the stream of clicks 142 received by testing server 110 is periodic based on the set of the assigned timestamps 118 stored in memory 114 and the duration of the sampling window.

If processor 116 finds that the stream of clicks 142 is periodic at one of the candidate periods 120, then processor 116 sends an alert 172 to security entity 170. Alert 172 indicates that the stream of clicks 142 may have been generated by a suspicious party. If, however, the result is that the stream of clicks 142 is not periodic at any of the candidate periods 120, then processor 116 may not send any alert.

Figure 2:
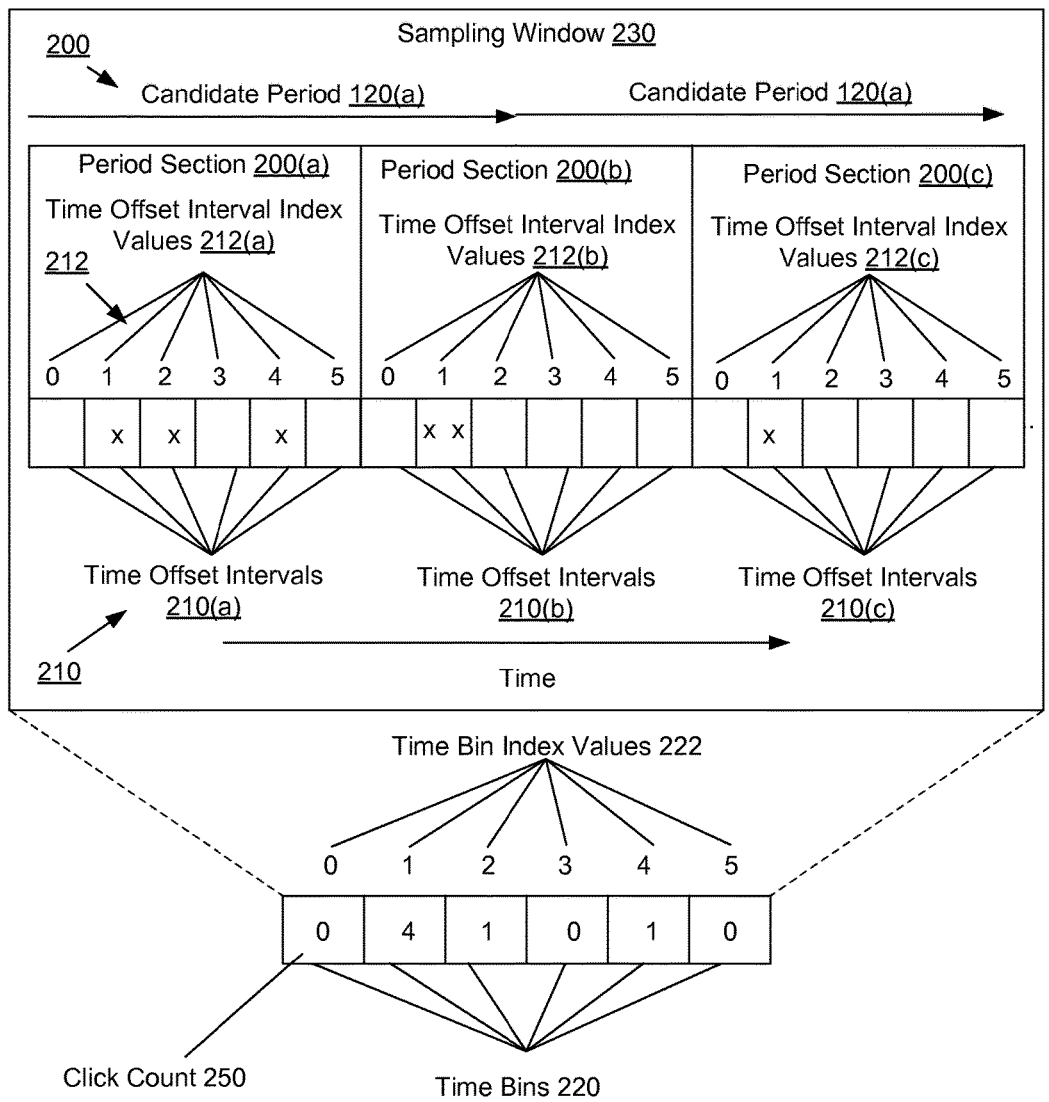
FIG. 2 is a diagram illustrating an example arrangement of clicks stored in memory in the testing server within the electronic environment shown in FIG. 1.
Figure 3:
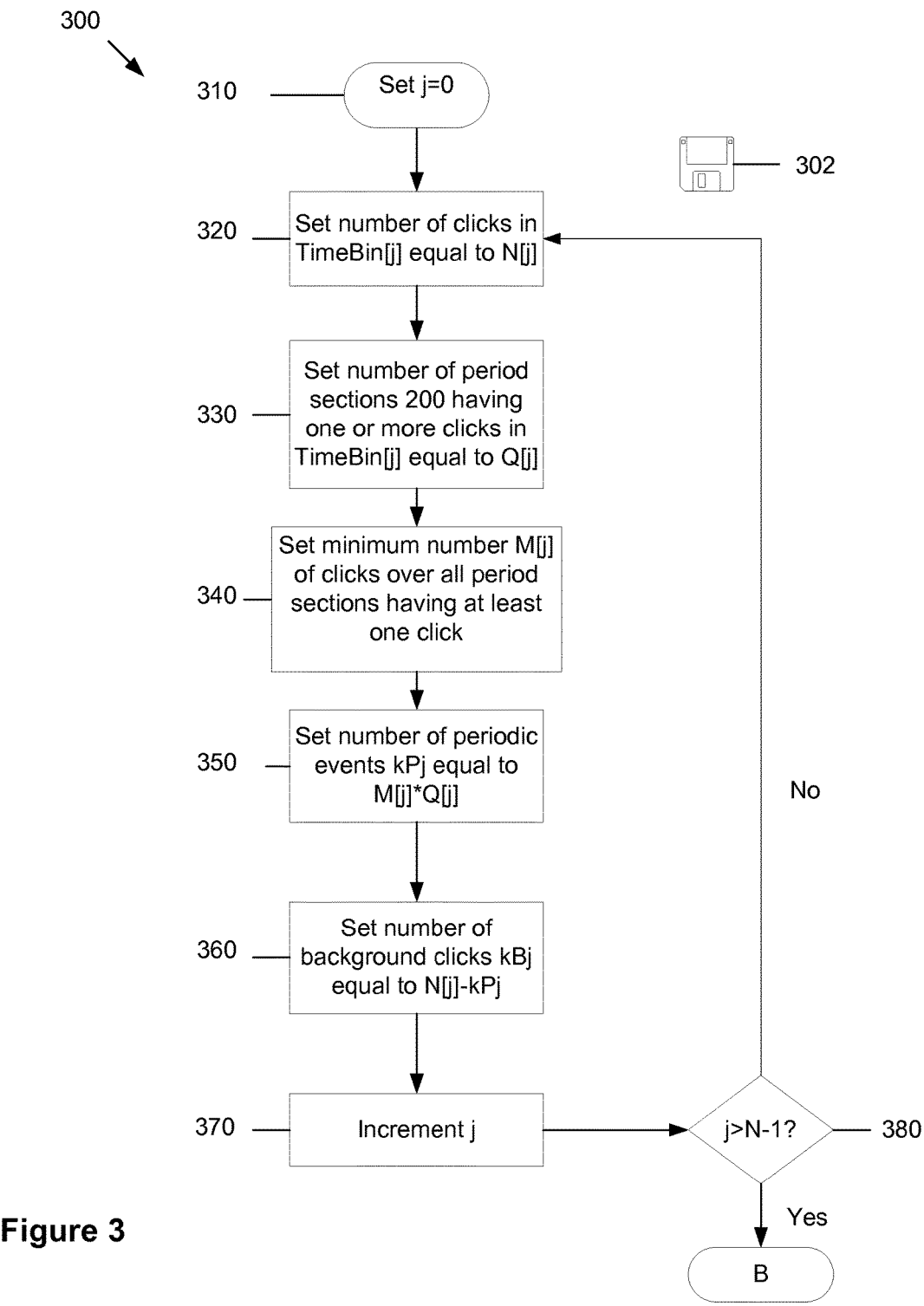
FIG. 3 is a flow chart illustrating an example click counting process carried out by the processor in the testing server within the electronic environment shown in FIG. 1.
Figure 4:
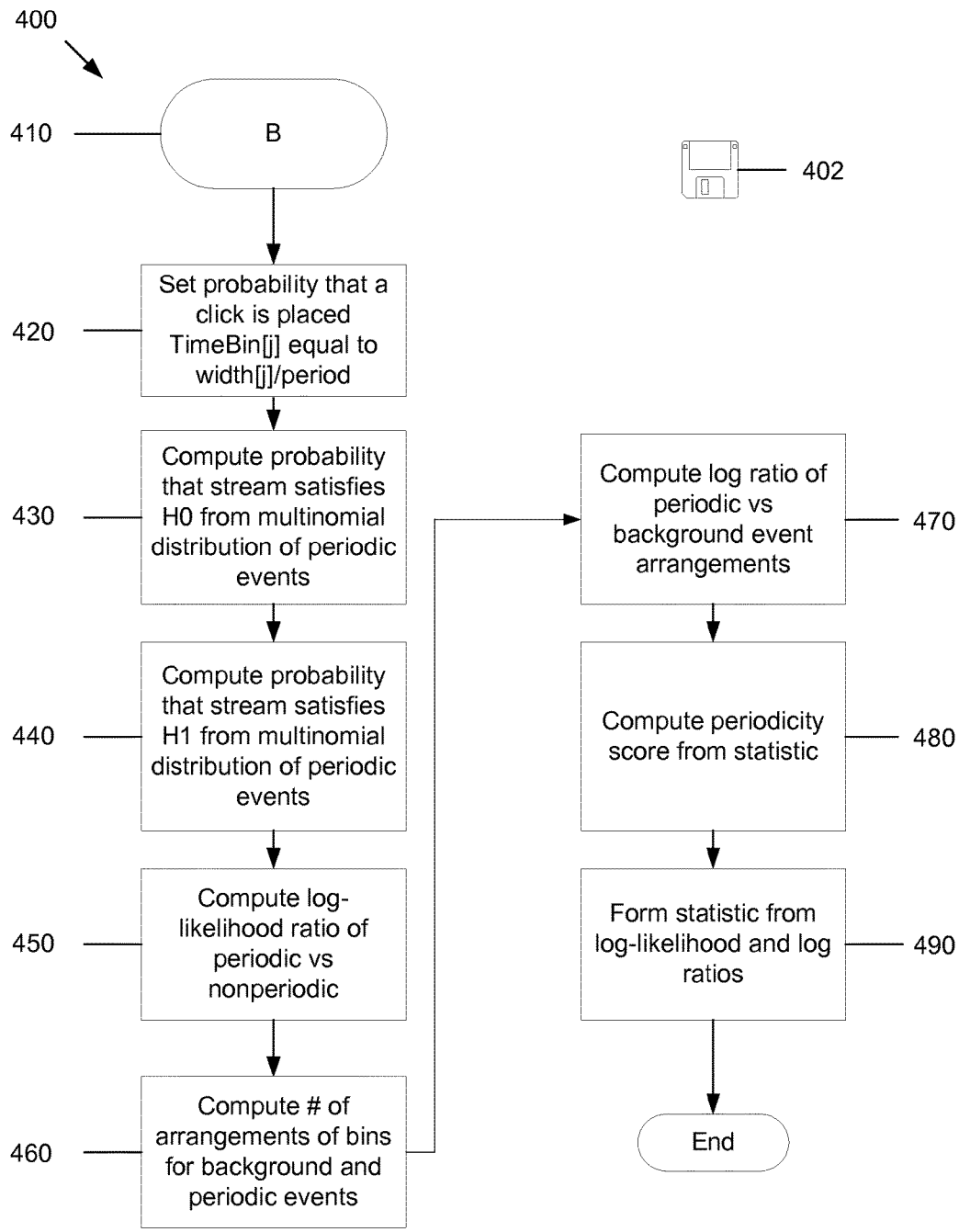
FIG. 4 is a flow chart illustrating an example periodicity scoring process carried out by the processor in the testing server within the electronic environment shown in FIG. 1.

Further details of the above-described test are now presented in connection with FIGS. 2, 3, and 4.

FIG. 2 illustrates an example sampling window 230 based on a particular candidate period 120(a). Using the locations of clicks 142 within sampling window 230, processor 116 determines whether the click stream is periodic at the particular candidate period 120(a).

When sampling window 230 has a duration that is n multiples of the particular candidate period 120(a), processor 116 divides sampling window 230 into p period sections 200(a), 200(b), . . . , 200(p) (period sections 200), with time increasing to the right as seen in sampling window 230. Processor 116 then subdivides each period section 200 into a set of N time offset intervals, i.e., N time offset intervals 210(a) corresponding to period section 200(a), N time offset intervals 210(b) corresponding to period section 200(b), and so on (for each time offset intervals 210). The time offset intervals within a given period section 200 each represent an interval of time relative to the beginning of the given period section 200. For example, within first period section 200(a) for a candidate period of six seconds, processor 116 might create six time offset intervals 210(a), each having a duration of one second. Processor 116 also assigns a time offset index value 212 to each of the time offset intervals. In this way, the first of the intervals 210(a), having a corresponding time offset index value 212(a) of zero, covers the interval between zero seconds and one second. Also, the second of intervals 210(a), having a corresponding index value 212(a) of one, covers the interval between one second and two seconds, and so on.

To continue this example, processor 116 subdivides second period section 200(b) into six time offset intervals 210(b), each having a duration of one second. The first of the intervals 210(b), having a time offset index value 212(b) of zero, covers the interval between six seconds and seven seconds (i.e., the interval between zero and one second for the period section 200(b)). The second of intervals 210(b), having index value 212(b) of one, covers the interval between seven seconds and eight seconds, and so on. This process is repeated for all of the p period sections.

It should be understood that there is no requirement for each of a set of time offset intervals 210(a) to be all of equal duration within a given period section 200. Rather, corresponding (i.e., having the same time offset interval index values 212) time offset intervals in different period sections 200 should preferably have the same duration, but different time intervals in the same period section need not have the same duration.

Processor 116 then assigns each of the clicks 142 to a time offset interval 210 according to its assigned timestamp. For example, FIG. 2 shows a click in each of index numbers one, two, and five in period section 200(a) and shows two clicks in index number one in period section 200(b). Note that a time offset interval may be assigned more than one click 142 (e.g., as shown in the second time interval in period section 200(b)).

Processor 116 then counts the number of clicks in all time offset intervals 210(a), 210(b), . . . , having a common offset interval index value 212. In FIG. 2, for example, processor 116 adds up the number of clicks 142 placed in the time offset intervals in period sections 200(a), 200(b), and 200(c) having a time offset interval index values 212 of zero, then repeats summing for index value 212 one, two, and so on, to produce a click count 250 for each index value 212.

Processor 116 places each click count 250 into a respective time bin 220. The respective time bin 220 has a corresponding time bin index value 222 equal to the time offset interval index value 212 from which click count 250 was generated. For example, consider the three period sections 200(a), 200(b), and 200(c) illustrated in FIG. 2. As there are no clicks 142 in any time offset interval 210(a), 210(b), 210(c) having their respective time offset interval index values 212(a), 212(b), 212(c) equal to zero, then the time bin 220 having a time bin index value equal to zero has a click count 250 of zero.

Similar operations on all other corresponding time offset intervals 210 produce the distribution of click counts 250 over time bins 220 illustrated in FIG. 2. Because each of the time bins 220 correspond to clicks 142 offset by the same interval in time with respect to the beginning of a period, the distribution of click counts may be indicative of periodicity. In FIG. 2, for example, the time bin 220 having an index value 222 of one has a click count of three, while all other time bins 220 have clicks counts 250 of zero or one. In this case, a time bin 220 of a particular index value 222 (one) having a click count 250 much higher than time bins having other index values may indicate that the stream of clicks is periodic.

Further details concerning the distribution of clicks in a stream may provide a more reliable determination of periodicity in a click stream. Such details are illustrated in FIG. 3. FIG. 3 illustrates an example detailed process 300 for determining which of the clicks in the stream are periodic or not. In step 310, processor 116 initializes a loop over all time bins 220 by setting a loop index j to zero. j represents the current time bin index value 222 referred to in the loop.

In step 320, processor 116 sets the click count in the time bin 220 having index value 222 of j to N[j].

In step 330, processor 116 computes the number of period sections 200 having one or more clicks 142 in the current time bin, and sets this number to Q[j]. For example, in FIG. 2, bins zero and three no such period sections, bins two and four have one, and bin one has three.

In step 340, processor 116 computes a minimum number M[j] of clicks 142 over all period sections 200 having at least one click. For example, in FIG. 2, time bin one in 220(a) and 22(c) have one click and in 210(b) has two clicks. M[1] is set to smaller value of 1 click. Bins 2 and 4 have one click in the first period 210(a) and zero clicks in the other two periods. The zero bins are ignored in calculation of the minimum. The M[j] is set to 1 for these two bins. The bins 0 and 3 have no clicks in any period. Their M[j] value is zero.

In step 350, processor 116 computes the number of periodic events, $k_j^P$ as M[j]*Q[j] for those intervals where Q[j] is greater than 2. For example, in FIG. 2, the number of periodic events in bin one is 3. For the other bins Q[i] is less than 3 and $k_j^P$ is set to zero.

In step 360, processor 116 computes the number of background clicks $k_j^B$, as N[j]−$k_j^P$. In the example in FIG. 2, bin one has a total of 4 clicks. Three of the clicks are signal clicks, so $k_j^B$, is set to 1. The other bins do not have any periodic clicks. Bins two and four have 1 background click. Bins zero and 3 has zero background clicks.

In step 370, processor 116 increments the loop index.

In step 380, the incremented loop index is compared with the number of time bins. If the incremented loop index is less than the highest time bin index value 222, then processor 116 returns to step 330. If on the other hand if the incremented loop index is greater than or equal to the highest time bin index value 222, then processor 116 proceeds to step B. In some arrangements, step B may indicate the end of process 300. In this case, a significantly high periodic event count and low background event count will indicate that a click stream is likely periodic. In other arrangements, however, step B may be a starting point of further analysis. Such analysis is illustrated in FIG. 4.

FIG. 4 illustrates another example process 400 which may be employed upon completion of process 300 in FIG. 3. In process 400, processor 116 performs additional analysis to quantitatively determine the likelihood that the click stream 142 is periodic.

In step 410, processor 116 starts process 400 at step B, i.e., having computed the number of periodic and background events, $k_j^P$ and $k_j^B$, respectively, in the jth time bin 220.

In step 420, processor 116 computes the probability $p_j$ that a single click would be placed in the jth time bin 220 as the ratio of the width of the particular time bin to the particular candidate period. When each time bin has the same width, this probability is simply 1/N.

In the discussion of the steps that follow, it will be useful to define two hypotheses: $H_0$, in which there is no periodic component of click stream 144, and $H_1$, in which there are both periodic and background components of click stream 144.

In step 430, processor 116 computes the probability $p_{H_0}$ that the click stream 142 obeys hypothesis $H_0$ based on the distribution of background events within time bins 220. In some arrangements, the model for this probability is a multinomial distribution defined as $$p_{H_0} = \frac{N!}{k_1! k_2! \ldots k_N!} p_1^{k_1} p_2^{k_2} \ldots p_N^{k_N}$$

In step 440, processor 116 computes the probability $p_{H_1}$ that the click stream 142 is obeys hypothesis $H_1$ based on the distribution of background and periodic events, or click counts 250, within time bins 220. In some arrangements, the model for this probability is a multinomial distribution defined as $$p_{H_1} = \frac{N_B!}{k_1^B! k_2^B! \ldots k_N^B!} p_1^{k_1^B} p_2^{k_2^B} \ldots p_N^{k_N^B}$$

where $k_j$ is the total number of background and periodic events in the jth time bin and where $N_B$ is the total number of background events.

In step 450, processor 116 computes the log-likelihood ratio, i.e., LLR=log($p_{H_0}/p_{H_1}$). The log-likelihood ratio is a measure of how much more likely that the click stream is nonperiodic than periodic. The logarithm here is assumed to be a natural logarithm; nevertheless, a logarithm of base 10, or any other base, may apply to this calculation.

In step 460, processor 116 computes the number of arrangements of the distribution of event counts satisfying hypotheses $H_0$ and $H_1$, $q_{H_0}$ and $q_{H_1}$, respectively, over the time bins 220. For either hypothesis, let $a_s^{H_m}$ be the number of bins in time bins 220 containing s events and satisfying hypothesis $H_m$, where m is either 0 or 1. This number is given by $$q_{H_m} = \frac{N!}{a_0^{H_m}! a_1^{H_m}! \ldots a_N^{H_m}!}$$

In step 470, processor 116 computes the log arrangement ratio of the number of arrangements in the $H_0$ hypothesis to the number of arrangements in the $H_1$ hypothesis, i.e., LAR=log($q_{H_0}/q_{H_1}$).

In step 480, processor 116 computes a statistic σ=LLR+ LAR.

In step 490, processor 116 computes a periodicity score Σ based on the statistic. In some arrangements, processor 116 computes the periodicity score as $$\sum = 50\left[1 + \tanh\left(\frac{\sigma - b}{a}\right)\right]$$

where a controls the sensitivity of the score to the statistic, and b is the statistic for which the score is 50. Typical values are a=1.6 and b=9.5, although other values may be used.

After processor 116 computes the periodicity score, process 400 ends.

Until now, the above discussion assumed that there was a list of candidate periods with which processor 116 could test a click stream 142 for periodicity. As mentioned in this discussion, processor 116 derives such a list from the timestamps assigned to the clicks in the stream.

Figure 5:
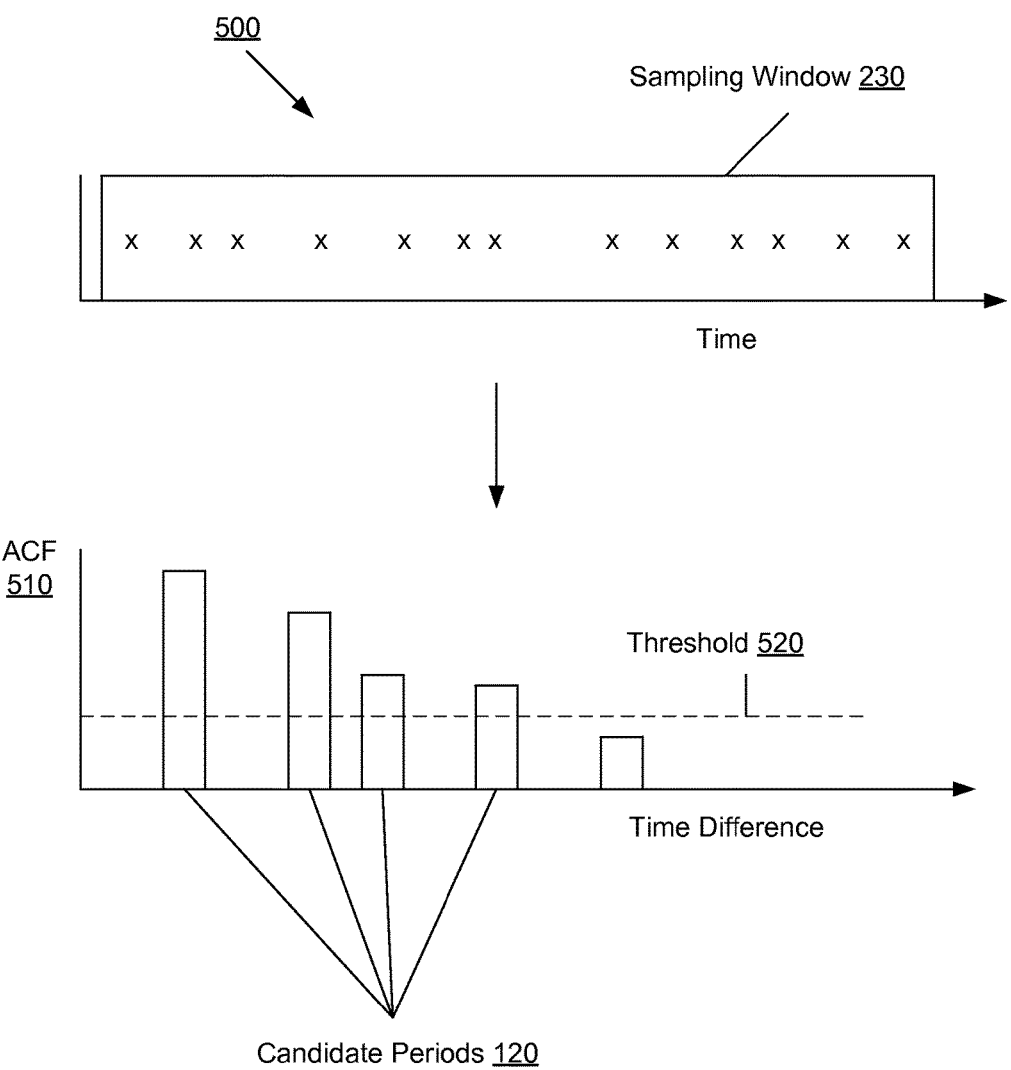
FIG. 5 is a block diagram illustrating an example candidate period generation carried out by the processor within the authentication server shown in FIG. 2.

FIG. 5 contains a description of how processor 116 derives that list. FIG. 5 illustrates an example distribution 500 of timestamps associated with clicks (i.e., a click stream) within sampling window 230. In some arrangements, processor 116 forms differences between pairs of the timestamps 500 assigned the clicks of the stream. Processor 116 then may select at least one of these differences as a candidate period.

In some arrangements, however, it is preferable to compute an autocorrelation function (ACF) 510 from distribution 500. ACF 510 of distribution 500 is another distribution of time differences rather than timestamps. The distribution of ACF 510, however, may have a frequency associated with each time difference. For example, in a perfectly periodic stream of N clicks, ACF 500 would have a spike at one period with frequency N−1, another spike at two periods with frequency N−2, another spike at three periods with frequency N−3, and so on.

In some further arrangements, and as illustrated in FIG. 5, processor 116 convolves ACF 510 with a kernel function (e.g, top-hat or Gaussian function). The kernel has a width proportional to a measure of network-noise-induced delay. The convolution of ACF with the kernel may produce a convolved ACF 510 as illustrated in FIG. 5. Processor 116 selects candidate periods based on those time differences having a frequency greater than some specified threshold 520.

Figure 6:
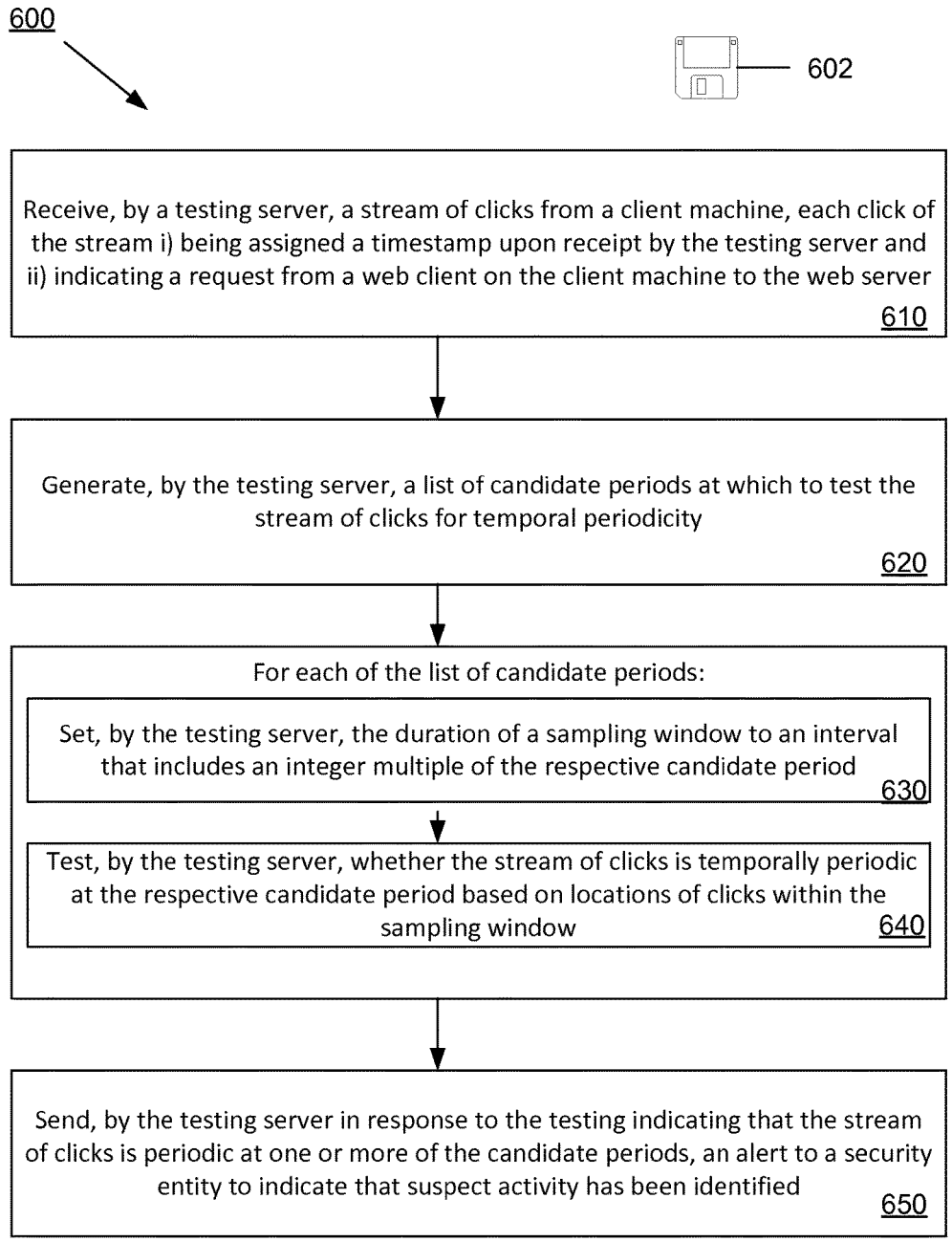
FIG. 6 is a flow chart illustrating an example method of carrying out the improved technique within the electronic environment shown in FIG. 1.

FIG. 6 illustrates a method 600 of identifying suspect access to a web server in a computing environment, including steps 610, 620, 630, 640, and 650.

In step 610, a testing server receives a stream of clicks from a client machine, each click of the stream i) being assigned a timestamp upon receipt by the testing server and ii) indicating a request from a web client on the client machine to the web server. As discussed above, however, one should keep in mind that, in the above discussion, a stream of "clicks" is really shorthand for a stream of clicks 142 issued from client machine 140. For example, automated programs that cause processor 116 to generate clicks, such a botnets, do not cause processor 116 to use the mouse or produce clicks; they simply cause processor 116 to generate clicks directly via a browser script or other program.

In step 620, the testing server generates a list of candidate periods at which to test the stream of clicks for temporal periodicity. For example, testing server 110 may generate an ACF that outputs frequency against time difference. The frequencies represent the number of times a time difference is represented in a click stream. Testing server 110 selects the frequencies represented at least a certain number of times in the ACF as the candidate periods for testing periodicity of the click stream.

In step 630, for each of the list of candidate periods, the testing server sets the duration of a sampling window to an interval that includes an integer multiple of the respective candidate period. As discussed above, it is useful to define the sampling window having its duration being a multiple of the candidate period under test because click counts in time bins become meaningful, in that each time bin has an equal chance to land a click. As was seen from the discussion, the computation of the log-likelihood ratio, from which the periodicity score is computed, is based on these click counts.

In step 640, for each of the list of candidate periods, the testing server tests whether the stream of clicks is temporally periodic at the respective candidate period based on locations of clicks within the sampling window. Again, because the sampling window is an integer multiple of the candidate period under test, click counts per time bin has meaning: a spike in a click count in one time bin indicates a likelihood of periodicity. Testing server 110 is also equipped to answer more details questions about whether the clicks themselves are part of a background or periodic set of events. From the determination of these sets of events, testing server 110 may compute a log-likelihood ratio of the probability that the click stream is a purely background process to the probability that the click stream is made up of background and periodic events. From this log-likelihood ratio, testing server 110 may compute a periodicity score.

In step 650, the testing server sends, in response to the testing indicating that the stream of clicks is periodic at one or more of the candidate periods, an alert to a security entity to indicate that suspect activity has been identified. For example, if the periodicity score of a candidate period is high enough, testing server 110 sends alert 172 to security entity 170. From there, an administrator operating security entity 170 may take further measures, such as investigating client computer 140 for botnet activity.

Improved techniques involve testing periodicity at a given period based on locations of clicks within a sampling window whose duration is a multiple of the given period. An example of such techniques has been described here in terms of testing server 110 and its components. Testing server 110 is able to accomplish such techniques by storing a predefined number of clicks of a stream in memory and analyzing their distribution in time. From this distribution, testing server may generate candidate periods at which the click stream may be periodic and then use those candidate periods in a well-defined periodicity test. This is marked improvement over the conventional approaches that do not appreciate how noise impacts the arrival times of clicks in a stream.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to testing server 110, which is constructed and arranged to identify suspect access to a web server in a computing environment. Some embodiments are directed to a process of identifying suspect access to a web server in a computing environment. Also, some embodiments are directed to a computer program product that enables computer logic to cause a computer to identify suspect access to a web server in a computing environment.

In some arrangements, testing server 110 is implemented by a set of cores or other types of control/processing circuitry running software. In such arrangements, the software instructions can be delivered, within testing server 110, either in the form of a computer program product 302, 402, and 602, or simply instructions on disk or pre-loaded in memory 114 of testing server 110, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of identifying suspect access to a web server in a computing environment, the method comprising:
 receiving, by a testing server within a computer, a stream of clicks from a client machine, each click of the stream i) being assigned a timestamp upon receipt by the testing server and ii) indicating a request from a web client on the client machine to the web server;

generating, by the testing server, a list of multiple candidate periods at which to test the stream of clicks for temporal periodicity;

for each of the list of multiple candidate periods:
  i) setting, by the testing server, a duration of a sampling window to an interval that includes an integer multiple of the respective candidate period; and
  ii) testing, by the testing server, whether the stream of clicks is temporally periodic at the respective candidate period based on locations of clicks within the sampling window; and sending, by the testing server in response to the testing indicating that the stream of clicks is periodic at one or more of the multiple candidate periods, an alert to a security entity to indicate that suspect activity has been identified, wherein receiving the stream of clicks includes obtaining the stream of clicks from a splitter located on a same local network as the web server, the splitter providing duplicates of each of the clicks of the stream to both i) the web server and ii) the testing server.

2. A method as in claim 1, wherein testing whether the stream is temporally periodic for each of the list of multiple candidate periods includes:

dividing the sampling window into a set of contiguous period sections, each of the period sections having a duration equal to the respective candidate period;

subdividing each of the period sections into N correspondingly-sized time offset intervals such that any i-th time offset intervals interval ($1 \leq i \leq N$) in any of the period sections has the same duration and location as every other i-th time offset intervals interval in each of the other period sections; and locating each click of the stream relative to the sampling window at a time offset interval of the set of correspondingly-sized time offset intervals according to the timestamp associated with that click;

wherein the correspondingly-sized time offset intervals that have the same beginning relative to the beginning of their respective period section form a set of time bins, each of the set of time bins having an index value $j$ ($0 \leq j \leq N-1$) representing the beginning of a time offset interval relative to the beginning of its respective period section;

wherein testing the stream of clicks for temporal periodicity at that candidate time period includes, for each time bin of the set of time bins, counting a number of clicks located in that time bin to produce a click count for that time bin, a click count for a particular time bin being significantly greater than the click counts for other time bins indicating that the stream may be temporally periodic at that candidate time period.

3. A method as in claim 2, wherein at least some of the stream of clicks is indicative of an event type including one of a periodic event and a background event, a periodic event indicating a request from a machine entity, a background event indicating a request from a human entity; and wherein counting the number of clicks located in each time bin of the set of time bins includes:

generating as a first count the number of period sections having one or more click in that time bin, generating as a second count the minimum number of clicks over all period sections of the set of period sections having one or more clicks, generating as the number of periodic events in that time bin the product of the first count and the second count, and generating as the number of background events in that time offset interval to be a difference between the number of clicks in that time bin and the number of periodic events in that time bin.

4. A method as in claim 3, wherein the clicks indicating periodic events and the clicks indicating background events each form a multinomial distribution over the set of time bins;

wherein each click of the stream is equally likely to be located in any of the set of time bins;

wherein testing the stream of clicks for temporal periodicity at that candidate period further includes:

computing i) the probability that the stream of clicks contains background events only from the multinomial distribution of the background events and ii) the probability that the stream of clicks contains both periodic and background events from the multinomial distribution of the clicks, respectively;

forming a statistic value based on the probability that the stream of clicks contains background events only and the probability that the stream of clicks contains both periodic and background events; and assigning a score to that candidate time period based on the statistic value, and wherein the method further comprises labeling the stream of clicks as resulting from suspect access or resulting from legitimate access based on the score assigned to each of the list of candidate time periods.

5. A method as in claim 4, wherein forming the statistic value includes generating a log-likelihood ratio of the probability that the clicks are periodic events to the probability that the clicks are background events.

6. A method as in claim 4, wherein assigning a score to each of the candidate time periods based on the statistic value includes adding a correction term to the statistic value, the correction term being based on a number of ways the set of bins may be arranged within a period section of the set of period sections after the stream of clicks have been placed in the set of time bins.

7. A method as in claim 1, wherein generating the list of multiple candidate periods includes forming differences between pairs of the timestamps associated with the clicks of the stream, the list of multiple candidate periods including at least one of the differences.

8. A method as in claim 7, wherein forming the differences includes:

generating an autocorrelation function (ACF) of the click stream, the ACF being a function of a time lag between clicks of the stream of clicks; and wherein generating the list of multiple candidate periods further includes, for each difference between the pairs of the timestamps, including that difference when the value of the ACF at that pairwise difference is greater than a threshold value of the ACF.

9. A method as in claim 8, wherein generating the ACF includes convolving a kernel on the ACF to form a convolved ACF, the kernel having a width based on a noise process within a network over which the clicks of the stream were received.

10. A method as in claim 1, wherein after the alert is sent to the security entity to indicate that the suspect activity has been identified, the security entity performs an investigation of the client machine for botnet activity.

11. A method as in claim 1, wherein setting the duration of a sampling window to an interval that includes an integer multiple of the respective candidate period includes producing the smallest multiple of the respective candidate period greater than a difference between a latest timestamp assigned to each click of the stream and an earliest timestamp assigned to each click of the stream.

12. A system constructed and arranged to identify suspect access to a web server in a computing environment, the system comprising a testing server including a controller, the controller including memory and controlling circuitry coupled to the memory, the controlling circuitry being constructed and arranged to:

receive a stream of clicks from a client machine, each click of the stream i) being assigned a timestamp upon receipt by the testing server and ii) indicating a request from a web client on the client machine to the web server;

generate a list of multiple candidate periods at which to test the stream of clicks for temporal periodicity;

for each of the list of multiple candidate periods:
  i) set a duration of a sampling window to an interval that includes an integer multiple of the respective candidate period; and
  ii) test whether the stream of clicks is temporally periodic at the respective candidate period based on locations of clicks within the sampling window; and send, in response to the testing indicating that the stream of clicks is periodic at one or more of the multiple candidate periods, an alert to a security entity to indicate that suspect activity has been identified, wherein the system further comprises a splitter located on the same local network as the web server, the spotter being configured to provide duplicates of each of the clicks of the stream to both i) the web server and ii) the testing server.

13. A computer program product comprising a non-transitory, computer-readable storage medium which stores executable code, which when executed by a testing server, causes the testing server to perform a method of identifying suspect access to a web server in a computing environment, the method comprising:

receiving, by a testing server, a stream of clicks from a client machine, each click of the stream i) being assigned a timestamp upon receipt by the testing server and ii) indicating a request from a web client on the client machine to the web server;

generating, by the testing server, a list of multiple candidate periods at which to test the stream of clicks for temporal periodicity;

for each of the list of multiple candidate periods:
  i) setting, by the testing server, a duration of a sampling window to an interval that includes an integer multiple of the respective candidate period; and
  ii) testing, by the testing server, whether the stream of clicks is temporally periodic at the respective candidate period based on locations of clicks within the sampling window; and sending, by the testing server in response to the testing indicating that the stream of clicks is periodic at one or more of the multiple candidate periods, an alert to a security entity to indicate that suspect activity has been identified, wherein receiving the stream of clicks includes obtaining the stream of clicks from a splitter located on a same local network as the web server, the splitter providing duplicates of each of the clicks of the stream to both i) the web server and ii) the testing server.

14. A computer program product as in claim 13, wherein testing whether the stream is temporally periodic for each of the list of multiple candidate periods includes:

dividing the sampling window into a set of contiguous period sections, each of the period sections having a duration equal to the respective candidate period;

subdividing each of the period sections into N correspondingly-sized time offset intervals such that any i-th time offset intervals interval ($1 \le i \le N$) in any of the period sections has the same duration and location as every other i-th time offset intervals interval in each of the other period sections; and locating each click of the stream relative to the sampling window at a time offset interval of the set of correspondingly-sized time offset intervals according to the timestamp associated with that click;

wherein the correspondingly-sized time offset intervals that have the same beginning relative to the beginning of their respective period section form a set of time bins, each of the set of time bins having an index value $j$ ($0 \le j \le N-1$) representing the beginning of a time offset interval relative to the beginning of its respective period section;

wherein testing the stream of clicks for temporal periodicity at that candidate time period includes, for each time bin of the set of time bins, counting a number of clicks located in that time bin to produce a click count for that time bin, a click count for a particular time bin being significantly greater than the click counts for other time bins indicating that the stream may be temporally periodic at that candidate time period.

15. A computer program product as in claim 14, wherein at least some of the stream of clicks is indicative of an event type including one of a periodic event and a background event, a periodic event indicating a request from a machine entity, a background event indicating a request from a human entity; and wherein counting the number of clicks located in each time bin of the set of time bins includes:
  generating as a first count the number of period sections having one or more click in that time bin,
  generating as a second count the minimum number of clicks over all period sections of the set of period sections having one or more clicks,
  generating as the number of periodic events in that time bin the product of the first count and the second count, and
  generating as the number of background events in that time offset interval to be a difference between the number of clicks in that time bin and the number of periodic events in that time bin.

16. A computer program product as in claim 15, wherein the clicks indicating periodic events and the clicks indicating background events each form a multinomial distribution over the set of time bins;

wherein each click of the stream is equally likely to be located in any of the set of time bins;

wherein testing the stream of clicks for temporal periodicity at that candidate period further includes:
  computing i) the probability that the stream of clicks contains background events only from the multinomial distribution of the background events and ii) the probability that the stream of clicks contains both periodic and background events from the multinomial distribution of the clicks, respectively;
  forming a statistic value based on the probability that the stream of clicks contains background events only and the probability that the stream of clicks contains both periodic and background events; and assigning a score to that candidate time period based on the statistic value, and wherein the method further comprises labeling the stream of clicks as resulting from suspect access or resulting from legitimate access based on the score assigned to each of the list of candidate time periods.

17. A computer program product as in claim 15, wherein assigning a score to each of the candidate time periods based on the statistic value includes adding a correction term to the statistic value, the correction term being based on a number of ways the set of bins may be arranged within a period section of the set of period sections after the stream of clicks have been placed in the set of time bins.

18. A computer program product as in claim 13, wherein generating the list of multiple candidate periods includes forming differences between pairs of the timestamps associated with the clicks of the stream, the list of multiple candidate periods including at least one of the differences.

19. A computer program product as in claim 18, wherein forming the differences includes:

generating an autocorrelation function (ACF) of the click stream, the ACF being a function of a time lag between clicks of the stream of clicks; and wherein generating the list of multiple candidate periods further includes, for each difference between the pairs of the timestamps, including that difference when the value of the ACF at that pairwise difference is greater than a threshold value of the ACF.

\* \* \* \* \*